Nov. 15, 1955

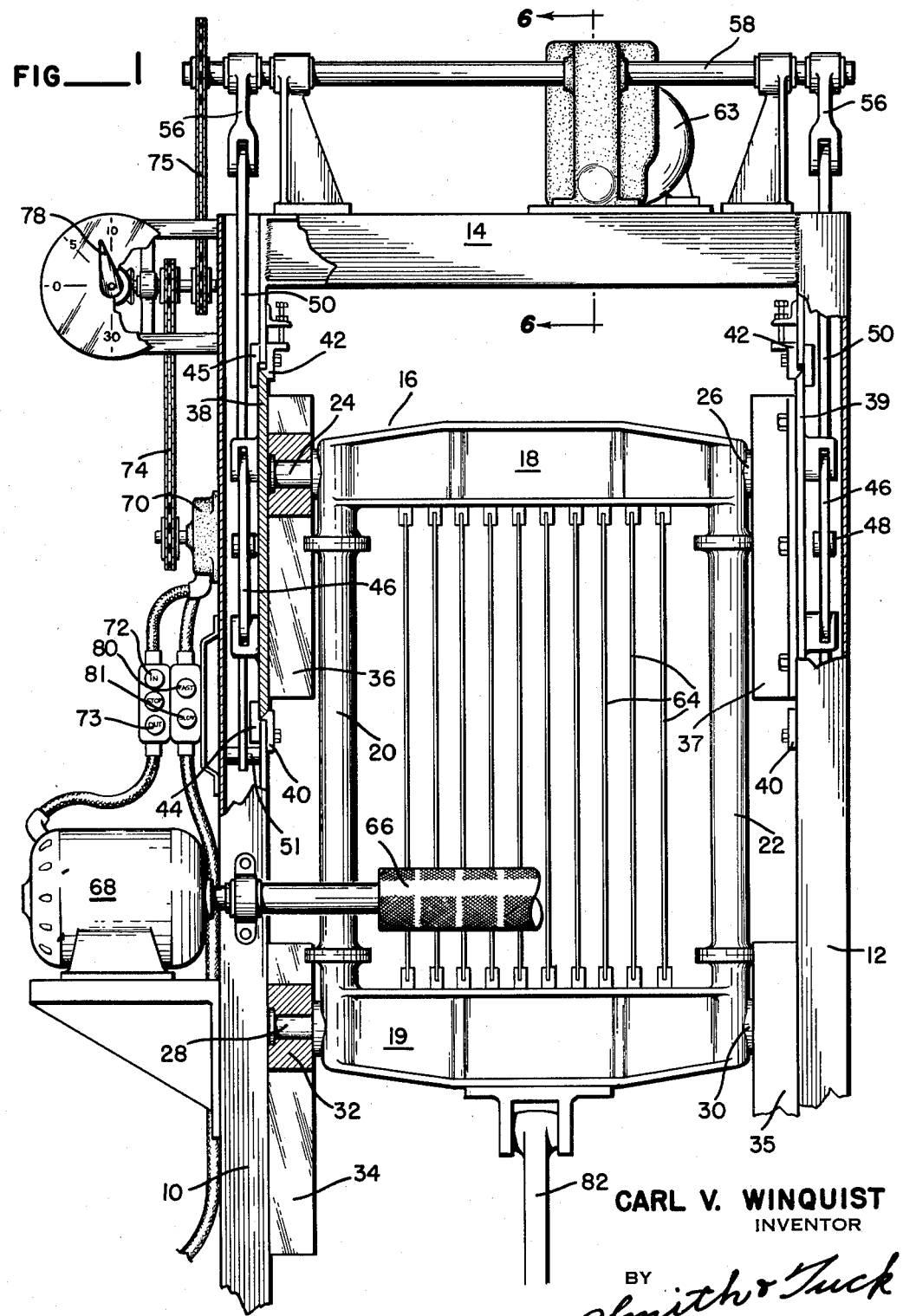

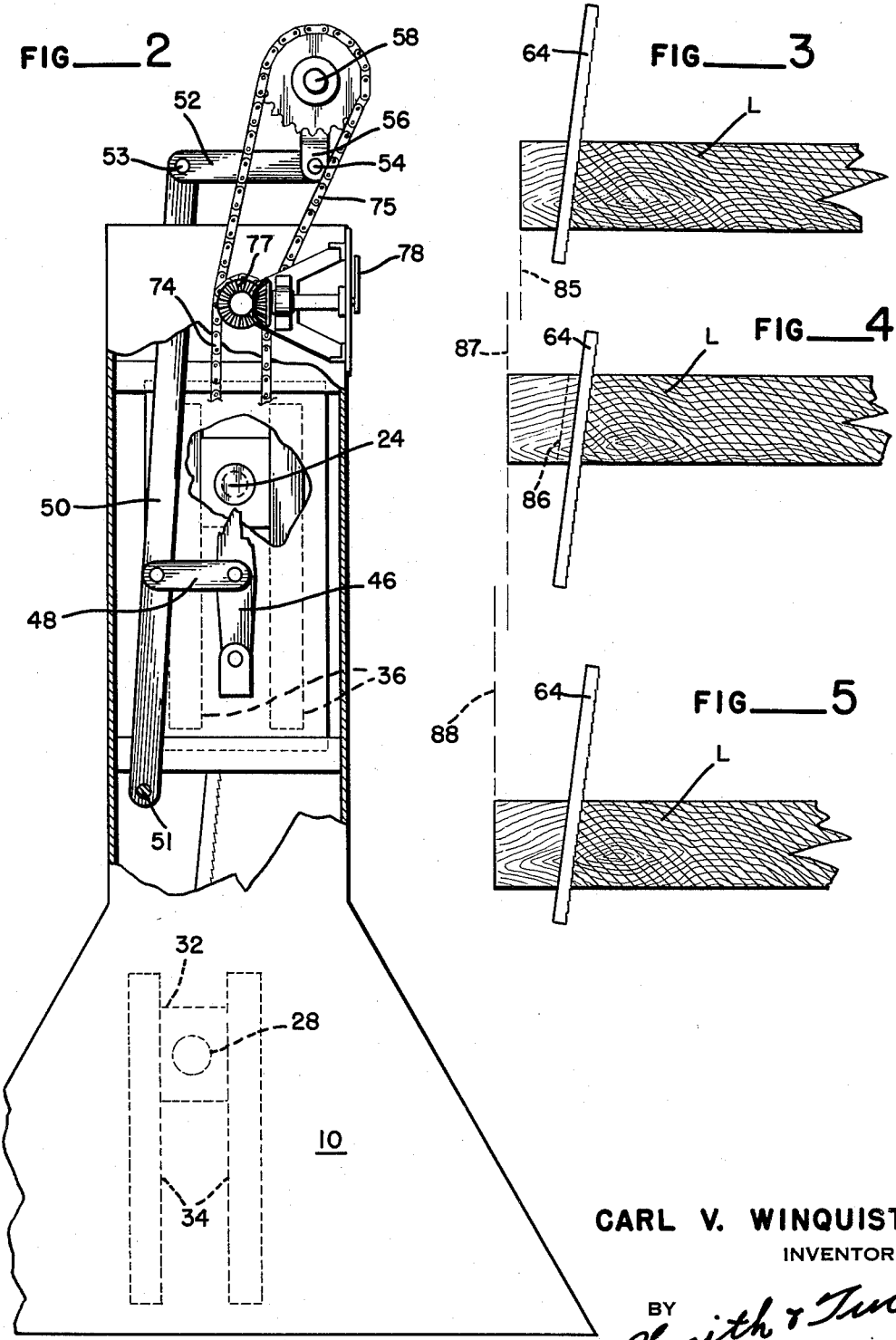

C. V. WINQUIST 2,723,689

COMPENSATING SAW OVERHANG AND
LOG FEED MEANS FOR GANG SAWS

Filed March 30, 1953

CARL V. WINQUIST
INVENTOR

BY
*Smith & Tuck*

United States Patent Office 2,723,689
Patented Nov. 15, 1955

2,723,689

COMPENSATING SAW OVERHANG AND LOG FEED MEANS FOR GANG SAWS

Carl V. Winquist, Seattle, Wash., assignor to Mill Engineering & Supply Co., Seattle, Wash.

Application March 30, 1953, Serial No. 345,278

4 Claims. (Cl. 143—84)

This present invention relates to the general art of gang saw construction of the type used in the sawing of logs or cants into a plurality of boards in a single operation. More particularly, this invention relates to means normally referred to as the saw overhang by which arrangement the saw automatically clears itself at each stroke. The means for varying the degree of overhang is operatively coupled to means controlling the feed rolls, which rolls in turn determine the rate of advancement of the log or cant through the gang saws.

In operating a gang saw where a plurality of thin saws are held in paralleled spaced relationship, the saws are normally formed with teeth which, for efficiency, are so constructed that they cut effectively only in one direction. The interstices between the teeth are relatively small and it is therefore necessary to provide some means whereby these teeth can clean themselves of the sawdust removed from the kerf. The ordinary circular saw or the band saw has such a large over-run that the teeth themselves have ample opportunity to unburden themselves of any accumulation of sawdust, but in a gang saw arrangement the length of the saw is relatively short in proportion to the face which they are cutting and it therefore becomes very desirable to provide adequate means for clearing the saws to the end that the sawdust itself will not provide a barrier preventing the saw teeth from fully engaging the face to be cut. A common expedient is to provide for a rocking of the saw's supporting carriage. Such an action is very common in drag saw structures and is normally employed by the carpenter when he is using a hand saw where the width of the cutting space is appreciable. However, when the relatively heavy saw frame and the associated saws are rocked or caused to oscillate during their cutting and retracting strokes it is necessary to operate the saws at relatively low cutting speed and even then considerable vibration is set up within the saw frame which is a very great deterrent to smooth efficient cutting.

In the past an alternate solution of the clearance problem has been to tip the top of the saws toward the infeed side of the gang, so that as the saw raises on the return stroke it will pull away from the cutting face and not re-engage it until it starts its downward stroke. Such an arrangement however calls for a very exacting balance between the angle of the saw, the operation speed of the saws, and the speed of movement of the logs through the saws, otherwise the saws will not adequately clear or will have excess clearance and cut down the efficiency of the entire operation. With any such arrangement, the agreed upon disposition of the saw and the speed of the advance of the logs would have to be constant and this greatly limits the gang saw which should be capable of making fast cuts in small logs and be capable of being slowed down when heavy or large logs or large cants are being sawed. This present invention is believed to provide a thorough solution of this problem in that both the feed speed of the logs and the inclination of the saw carriage is immediately capable of being varied and this invention makes it possible to always have the two variables made in a degree so that they are compensating and will permit, therefore, the greatest or most efficient use of the saw equipment.

The principal object of this present invention therefore is to provide a variable speed log feed, a means for varying the inclination of the saws, and means for coupling the two control means together in a manner which will make them self-compensating.

A further object of this invention is to provide power means for varying the inclination or presentation of the cutting saws and to provide a remote control for this means.

A further object of this invention is to provide a variable speed drive for the feed means of a gang saw and to have this variable control means cooperatively joined to the saw inclining means so that each will be adapted to the other to the end of producing the greatest possible cutting efficiency.

A further object of this invention is to provide that the guide means for one end of the saw carrying sash be capable of movement along the longitudinal axis of the logs being cut by the saws and permitting the angular adjustment of the sash while in operation.

A further object of this invention is to provide reversible power means for changing the angularity of the saw sash while it is operating.

Further objects, advantages and capabilities will be apparent from the description and disclosure in the drawings, or may be comprehended or are inherent in the device.

In the drawings:

Figure 1 is a fragmentary face view, in elevation, showing the upper portion of a gang saw and with certain parts shown in section;

Figure 2 is a fragmentary side elevation of the saw of Figure 1 with certain parts shown in section;

Figures 3, 4 and 5 are diagrammatic views illustrating the movement of a log or cant through the gang saw with the relative positions of the cutting saw blades;

Figure 6:
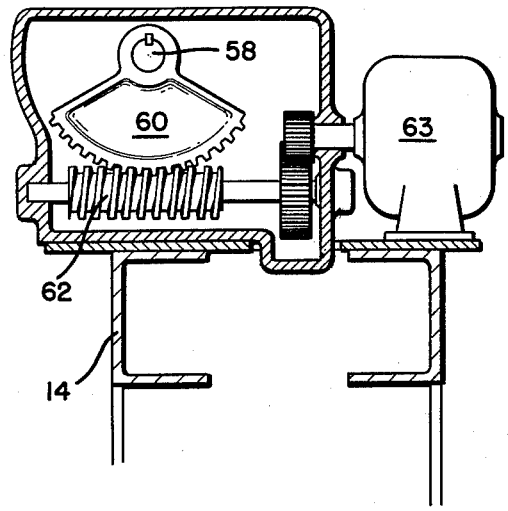
Figure 6 is a fragmentary, vertical sectional view taken along the line 6—6 of Figure 1.

Referring more particularly to the disclosure in the drawings, the numerals 10 and 12 designate respectively the two vertical side frame members of the gang saw. These are joined together by a top cross member 14. These frames are made in various manners but the more common at this time is to fabricate the same from steel plate which has been welded into a unit in order to insure rigidity.

Disposed for vertical reciprocation within the framework thus provided is the saw sash generally designated as 16. A sash of this order is usually constructed in a manner to give it adequate strength with a minimum of weight and, as shown in this preferred arrangement, upper cross member as 18 and the lower cross member 19 are castings and are joined together by preferably tubular members 20 and 22 which are appropriately flanged so as to form a secure engagement with these upper and lower frame members. Members 18 and 19 are each provided with oppositely directed upper trunnion members as 24 and 26, and lower trunnions 28 and 30. Each of these trunnions is provided with a suitable slipper member as 32 and these slipper members in turn are adapted for vertical movement within guide members 34, 35, 36 and 37. In this particular showing the lower guide members as 34 and 35 are fixedly secured to frame members 10 and 12 respectively, while the upper guide members 36 and 37 are mounted in guideway supporting members 38 and 39 respectively, capable of movement in a fore and aft direction in a manner and for reasons which will be best understood from the following description.

Supporting members 38 and 39 are supported for horizontal movement parallel to the direction of the log travel by the fixed track members 40 and the vertically adjustable track members 42. Completing this trackway are the fixedly secured track flange members 44 and 45. A preferred means for moving and controlling the positioning of the supporting members 38 and 39 is illustrated in Figures 1 and 2. This consists of a vertically disposed bar 46 which is secured near the upper and lower margins of the supporting members 38 and 39 by engagement with suitable block bosses made as part thereof. A connecting link 48 joins the midpoint of bar 46 with the vertically disposed lever 50. This lever is pivoted on the fixed pivot 51 and extends upwardly above cross frame member 14. Here it is engaged by extension link 52 being pivotably connected at 53 at one end and pivotably connected at its opposite end by pivot 54 to a crank arm 56. It is to be understood that this equipment is in duplicate, one for each side of the main saw frame so as to effectively control the supporting members 38 and 39 which are disposed on opposite sides of sash 16.

Referring to Figures 1 and 6, crank members 56 are fixedly secured to the partially revolvable shaft 58. Shaft 58 has fixedly secured to it a worm gear segment as 60 adapted to operatively engage a worm 62. Worm 62 in turn is energized by motor 63 through its associated reduction gearing. Such arrangements are normally referred to as motor gear drives and the overall intent is to give cooperation output of the gear box and to at the same time hold the same in the desired position by locking means, in this case, the worm and worm gear. It is necessary that this motor and gear arrangement be capable of reversal and the simplest form of this appears to be where a reversing motor 63 is employed. Thus it will be understood, it is believed, that as gear segment 60 is revolved throughout the range of its movement it will, through shaft 58 and crank 56, move the two levers 50 in unison so as to in turn move the guideway supporting members 38 and 39 in unison and when the same have been moved into a new position, worm 62 will hold the same in that desired adjusted position.

The speed of movement of logs through the various saws 64 is controlled by one or more feed rolls 66. Rolls 66 are driven by a variable speed drive means. It has been quite common to employ a friction drive arrangement so as to vary the rotating speed of rolls 66 through a wide range. With the higher development in electric motors however, it has been most desirable to employ a variable speed and reversible motor, as 68, usually of a direct current type and to control the rotative speed of motor 68 by a conventional type of rheostat 70. The direction of rotation of motor 68, corresponding to an in-feed or an out-feed, is controlled by suitable push buttons 72 and 73. However, the variation in speed of the motor is still controlled by the rheostat 70. The rheostat 70 is connected by suitable means, as chains 74 and 75, which are operatively coupled to shaft 58. The chains through suitable sprockets nad gear means illustrated at 77, control the indicator pointer 78 which indicates the speed per minute of log movement caused by the setting of rheostat 70 and its effect upon the drive motor 68. The tilting drive motor 63 is controlled by push buttons 80 and 81 which make it possible to incline sash 16 to take care of faster or slower movement of the logs through the saws. Sash 16 is driven at normally a uniform speed through suitable crank means, having separate drive means, to which connecting rod 82 is attached.

Method of operation

Figure 7:
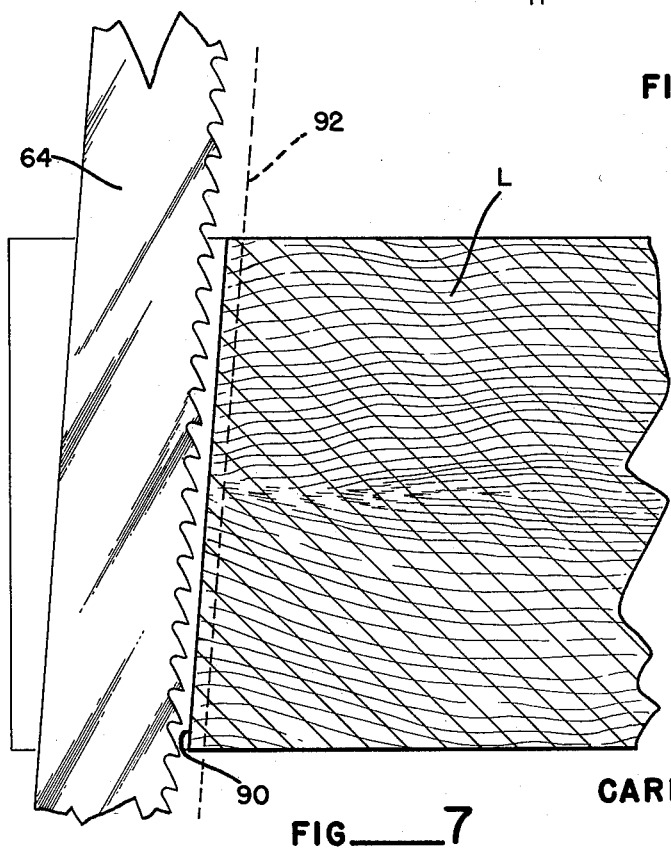
Figure 7 is a fragmentary vertical sectional view illustrating the saw clearance and log travel.

The operation of this equipment will probably best be understood by a study of Figures 3, 4, 5, 7 and 8. In Figure 3 saw 64 has just started a cut in a log or cant L. The leading end of the log is indicated by the dashed lines 85. In Figure 4 the saw has completed the cutting stroke and has advanced into the log the distance from the saw teeth to the dotted line 86. During this time the log has advanced to the dashed line 87, or the difference in displacement between lines 85 and 87. In Figure 5 the saw has been returned to its starting position and is again engaging the bottom of the saw kerf and the log which has been continuously advancing, has advanced to the dashed lines 88. Referring to Figure 7 where the cut is shown on an increased scale, the saw 64 because it is angularly disposed with respect to log L instead of being normal thereto, has moved away from the bottom of the saw kerf 90 as the sash carries it upwardly. At the bottom of its stroke the saw's position is indicated by the dashed line 92 and it will be noted that the log as it is continuously advancing through the gang saw has moved the distance from line 92 to line 90 during the period the saw was moving upwardly and at the same time away from line 90. Now it has been found desirable in handling heavy reciprocal masses to use a crank and connecting rod in that acceleration and deceleration are achieved at the end of the crank's strokes with the least shock to the reciprocating mass. This is particularly noted in reciprocating engines. However, it is time consuming for the connecting rod and crank system to stop the upward movement of the sash bearing saws 64 and to start it down again and the clearance indicated in Figure 7 between line 90 and the tip of the saw teeth should be so adjusted by the means illustrated and described that the saw teeth will re-engage log L at the time when the saw has picked up an appropriate speed in its power stroke, which is downward. This is illustrated in Figure 5.

Figure 8:
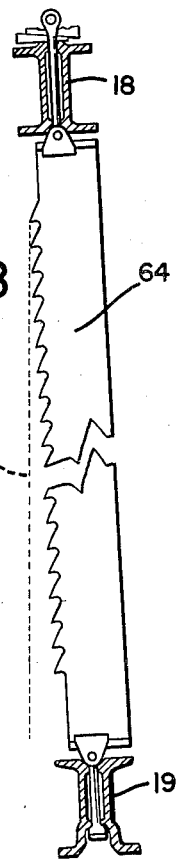
Figure 8 is a vertical sectional view, through the saw sash, along one of the saws.

Figure 8 is illustrative of the angularity of the line of the saw teeth and the line of movement 94 of the saw, it being kept in mind, of course, that the saw teeth are always presented to the incoming log so that in this instance the log is moving from the left of the saw to the right. In Figure 8 the trunnions are not shown but it is only as a matter of convenience that the upper trunnions are normally the adjustably positioned ones. With the mechanism illustrated this is the most convenient arrangement. In certain arrangements it might be desirable to have the lower trunnion mechanism, the adjustable one.

In operating gang saw equipment of this order, the operator usually stands where he can watch the operation and be convenient to the push buttons shown in Figure 1 which controls the operation of this gang. In this particular arrangement it will be noted that his settings are a function of the speed with which the log or cant can be passed through the gang and, this again is a function of the amount of the work done by the saw. A hard or thick cut will require a slowing up of the feed rolls 66 and this is accomplished indirectly by the push buttons 80 and 81, which are suitably named and the operator holds the necessary button down to continue the operation of motor 63 in either sense changing the angularity of the sash through shaft 58 and the associated linkage also drives, through chains 74 and 75, the rheostat 70 which in turn controls the speed of the motor 68 driving feed rolls 66. Incidentally the indicator 76 is operated and indicates to the sawyers the log speed, in feet per minute, through the machine. This form of control definitely assures the fullest coaction between the angle of presentation of the saws and the log feed and assures a fully compensating arrangement.

It is believed that it will be clearly apparent from the above description and disclosure in the drawings that the invention comprehends a novel construction of a compensating saw overhang and log feed means for gang saws.

Having thus disclosed the invention, I claim:

1. In a gang saw of the type having a vertically movable blade-carrying sash, a frame supporting the sash by vertically separated pairs of guideways one pair of which is fixed and the other horizontally movable in said frame for varying the inclination of the saw blades and power feeding means operative to feed logs into the saw at a rate compensated to the inclination of said saw blade, the improvement, comprising: a first electric motor powering said feeding means and a rheostat connected to said electric motor and operative to control the speed of said motor, a second electric motor having positive mechanical means operative to move said movable guideway to control the inclination of said saw blade without slippage, control means to start and stop said second electric motor, and positive mechanical means connecting said second electric motor and said rheostat so that said rheostat will be changed in setting responsive to movement of said movable guideway without slippage, whereby direct mechanical connection is provided between the means for controlling said power means and the means for positioning said movable guideway.

2. The subject matter of claim 1 in which said positive mechanical means between said movable guideways and said second motor includes a horizontal shaft supported at the top of said frame and having at each end a crank affixed thereto, a vertically disposed lever for each crank connected at one end thereto by an intermediate extension link and having its other end pivotally connected to said frame, a vertically disposed bar associated with each movable guideway having one end pivotally connected to said frame and said bar being connected to said movable guideway at a point removed from the pivot and a connecting link between said vertical lever and said vertical bar whereby said movable guideway is responsive to movement of the associated crank, a gear segment fixed to said horizontal shaft, and said second motor having a driving worm gear meshed with said gear segment whereby the worm gear locks said movable guideways in position when said second motor is stationary.

3. The subject matter of claim 2 in which said positive mechanical means connecting said second electric motor and said rheostat includes a first sprocket wheel on said horizontal shaft, said rheostat having an operating shaft on which is mounted a second sprocket wheel and chain means connecting said sprocket wheels whereby the rheostat is responsive to movement of said second motor.

4. The subject matter of claim 1 in which there is indicator means mechanically connected to the rheostat and responsive to changes in the setting of the rheostat to indicate the rate of feeding of logs by the power feeding means.

References Cited in the file of this patent

UNITED STATES PATENTS

| | | |
|---|---|---|
| 1,010,091 | Tenow | Nov. 28, 1911 |
| 1,262,421 | Wilkin | Apr. 9, 1918 |
| 1,794,350 | Osterberg | Feb. 24, 1931 |